United States Patent [19]

Fleischhauer

[11] 4,214,148
[45] Jul. 22, 1980

[54] INDICATOR FOR THE EXTENT OF CLARIFICATION OF WATERHEATERS IN ELECTRIC HOUSEHOLD APPLIANCES

[75] Inventor: Werner Fleischhauer, Stein, Fed. Rep. of Germany

[73] Assignee: Bosch-Siemens Hausgeräte GmbH, Stuttgart, Fed. Rep. of Germany

[21] Appl. No.: 864,476

[22] Filed: Dec. 27, 1977

[30] Foreign Application Priority Data

Dec. 27, 1976 [DE] Fed. Rep. of Germany ....... 2659079

[51] Int. Cl.$^2$ ...................... H05B 1/02; A47J 31/56; A47J 31/58; F24H 1/10
[52] U.S. Cl. ...................................... 219/308; 99/281; 99/285; 99/288; 99/307; 219/283; 219/330; 219/506; 222/146 HE
[58] Field of Search ......................... 219/283, 296–309, 219/322, 327, 328, 330, 331, 506; 99/279–283, 285, 288, 304–307; 222/146 HE

[56] References Cited
U.S. PATENT DOCUMENTS

| 3,711,681 | 1/1973 | Leuschner et al. | 219/283 X |
| 4,122,763 | 10/1978 | Waninger | 99/281 |
| 4,139,761 | 2/1979 | Obrowski | 219/308 |

FOREIGN PATENT DOCUMENTS

| 2431538 | 1/1976 | Fed. Rep. of Germany | 99/279 |
| 2605643 | 8/1977 | Fed. Rep. of Germany | 219/308 |
| 2611261 | 9/1977 | Fed. Rep. of Germany | 219/308 |

*Primary Examiner*—A. Bartis
*Attorney, Agent, or Firm*—Herbert L. Lerner

[57] ABSTRACT

Calcification sufficient to cause material impairment of heat transfer is indicated in a water heater in an electric appliance, such as a coffee maker. The water heater has a first and a second temperature-dependent switch thermally coupled thereto. The first switch serves as a final interrupter or temperature control. The switching temperature of the second switch is below that of the first one in the range of temperatures which occur in the water heating operation if excessive calcification is present. A time delay member after a predetermined time actuates an indicating signal. The time delay member is in operation when only the second temperature-dependent switch is in responded condition. The time delay member ceases operation and returns to its original state when both temperature-dependent switches are in the responded state or the original condition.

10 Claims, 11 Drawing Figures

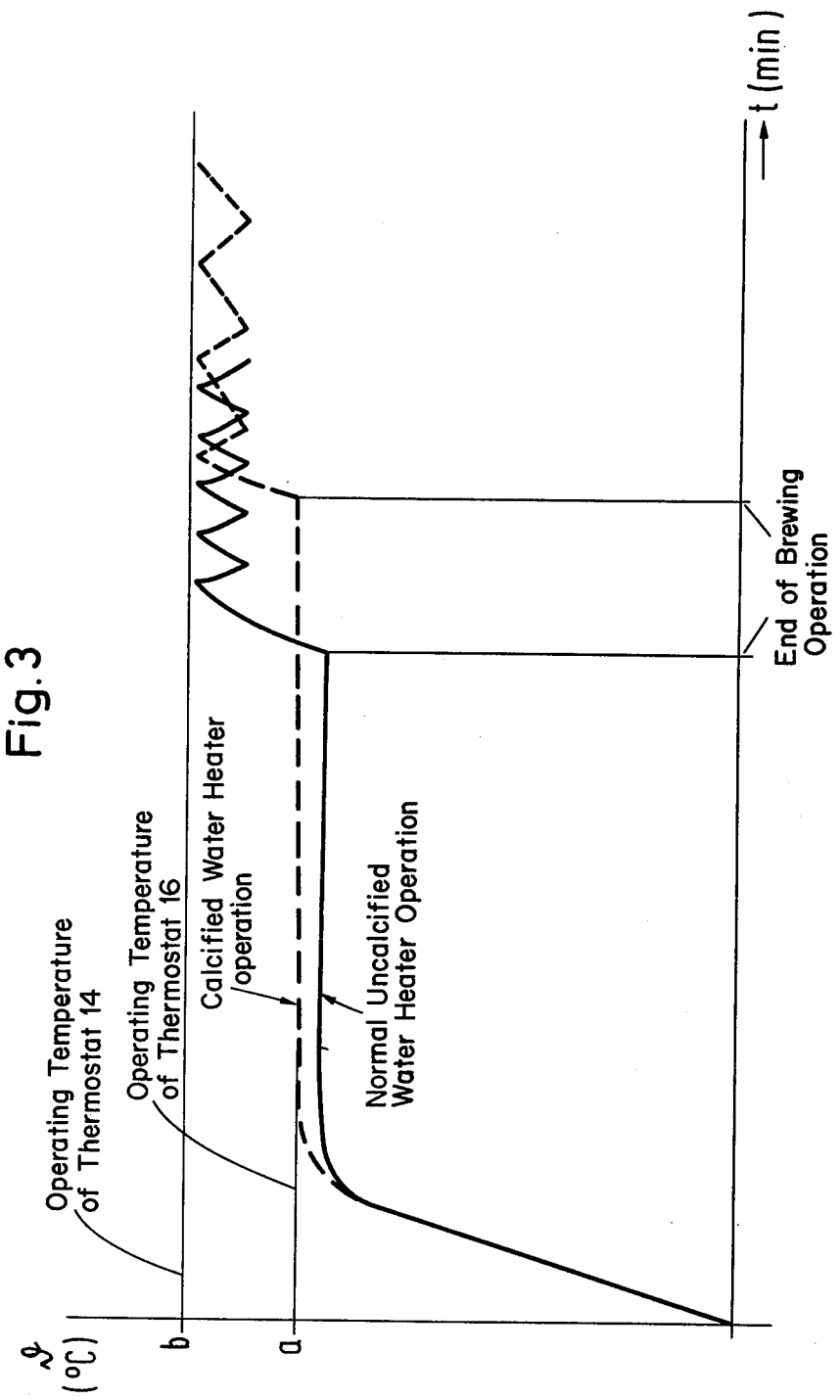

INDICATOR FOR THE EXTENT OF CLARIFICATION OF WATERHEATERS IN ELECTRIC HOUSEHOLD APPLIANCES

BACKGROUND OF THE INVENTION

1. Field of the Invention

This invention relates to a water heater in electric household appliances, and more particularly refers to a new and improved water heater having means for indicating calcification of the water heater.

2. Description of the Prior Art

In one proposed indicating device of this type for an electric coffee maker, a temperature-dependent switch is inserted into the freshwater tank of the coffee maker in addition to two switches for the purpose of preventing a false indication which can occur due to temperature fluctuations in brewing operation, i.e., in water heating operation.

Another known coffee maker uses a water pressure cell arranged below the freshwater tank with a diaphragm switch. These known or proposed solutions are difficult to manufacture and are therefore expensive. Furthermore, none of the known calcification indicators and trouble-free under all conditions occurring in operation.

SUMMARY OF THE INVENTION

An object of the present invention is to provide a water heater with an indicating device to indicate calcification, the manufacturing cost of which is reduced and which is substantially free of indication errors under all operating conditions.

With the foregoing and other objects in view there is provided in accordance with the invention, a water heater in electric household appliances subject to calcification-caused reduction in heat transfer through the wall of the water container of the water heater. The water heater has a heater resistor adjacent the water container, with a first temperature-dependent switch thermally coupled to the water container being in circuit with said heater resistor to act as the final control for the water heater. The improvement comprises the combination therewith of means for indicating calcification of the water heater. The calcification indicating means comprises a second temperature-dependent switch thermally coupled to the water container, the switching temperature of the second temperature-dependent switch being below the switching temperature of the first temperature-dependent switch and with both switching temperatures in the range of temperatures which occur with calcification in the water-heating operation. A calcification indicating signal and a time delay member is operative after a predetermined time delay to actuate said indicating signal. The time delay member is so arranged in circuit with said first and second temperature-dependent switches that said time delay member is operative to actuate said indicating signal when only a second temperature-dependent switch is in responded condition. The time delay member ceases operation and returns to its original state when both temperature-dependent switches are in their responded state or their original condition.

Other features which are considered as characteristic for the invention are set forth in the appended claims.

Although the invention is illustrated and described herein as embodied in indicator for the extent of calcification of water-heaters in electric household appliances, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 3 is a diagram in which the temperature at the continuous-flow heater of the electric coffee maker according to FIGS. 1 and 2 is plotted versus time.

DETAILED DESCRIPTION OF THE INVENTION

In accordance with the invention a water heater has a first and a second temperature-dependent switch thermally coupled thereto, and, there is provided a time delay member which actuates an indicating signal after a predetermined delay time and which runs as long as only the first temperature-dependent switch is in the responded state, and stops and returns to its original condition as long as both temperature-dependent switches are in the responded or in the original condition.

This indicating device has the advantage that short-term temperature fluctuations cannot release a false indication. Furthermore, releasing the indicating signal is prevented in keeping-hot operation when there is no water in the water heater, as the time delay of the time delay member can be matched to the control cycle of the first temperature-dependent switch.

The time delay member comprises advantageously a slow-responding, current-dependent switch. In the case of a water heater which has a safety temperature control which responds above the response temperature of the first temperature-dependent switch, this control can be designed as a current-dependent switch and can form part of the time delay member. This design of the time delay member is particularly advantageously, as only a slightly more expensive switching element must be used instead of the one that is required. In addition, the number of necessary components is minimized. The second temperature-dependent switch is preferably connected parallel to the safety temperature switch. Alternatively, the current-dependent switch can have a resistor heating a bimetal element, preferably a PTC (Positive Temperature Coefficient) resistor, or generally a temperature-dependent switching element such as a PTC or NTC (Negative Temperature Coefficient) resistor and a heater therefor.

In the following, referring to schematic drawings, the invention will be explained with the aid of embodiment examples.

Figure 1:
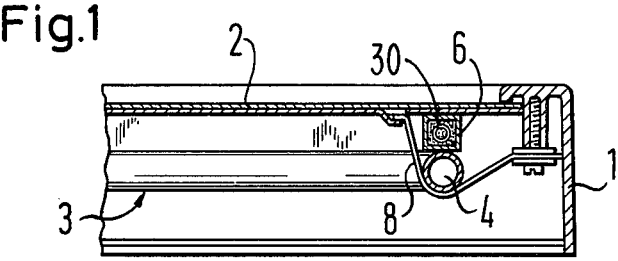
FIG. 1 shows a cross section substantially along the line I—I in FIG. 2 through the housing on an electric coffee maker in the area of the keep-hot plate with a continuous-flow heater arranged underneath.
Figure 2:
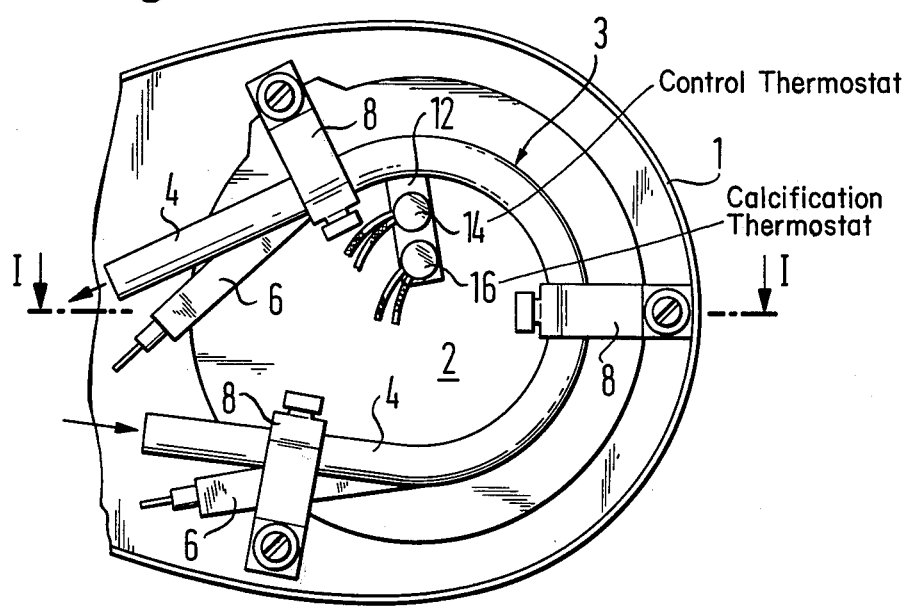
FIG. 2 is a view from the bottom into the housing of the coffee maker of FIG. 1 with the bottom removed.
Figure 1A:
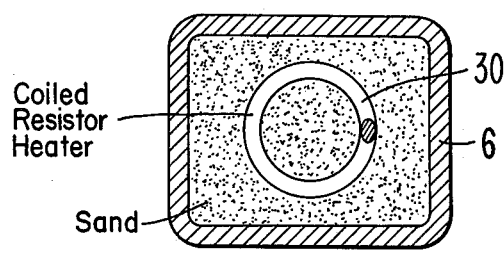
FIG. 1a is an enlargement of heater 30 in FIG. 1 showing it in greater detail.

In the housing 1 of an electric coffee maker, a keep-hot plate 2 of sheet metal is arranged as illustrated in FIGS. 1 and 2. Underneath the keep-hot plate 2, a continuous-flow heater 3 is arranged, which continuous-flow heater 3 consists of a water tube 4 and a tubular heating element 6 soldered thereto. The continuous-flow heater 3 is fastened to the keep-hot plate 2 and fastened in the housing 1 by means of resilient clamping brackets 8. The direction of the water flow through the water tube is indicated by arrows. A first temperature-dependent switch 14 serving as an on-off temperature control and a second temperature dependent switch 16 are fastened in good thermal contact to a sheet metal strap 12 which is soldered to the continuous-flow heater 3.

Figure 4:
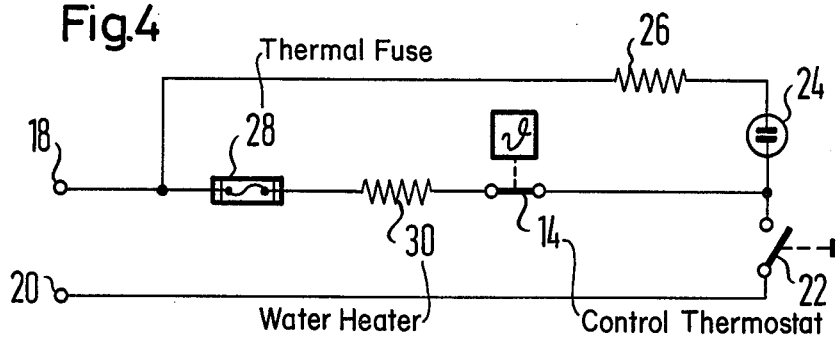
FIG. 4 is a circuit diagram of the electrical portion of a known coffee maker without a calcification indicator.

FIG. 4 shows an electric system of a coffee maker without a calcification indicator, as known in the art. There are two line terminals 18 and 20, and terminal 20 is connected to the terminal 18 via a circuit consisting of an on-off switch 22, a glow lamp 24 indicating operation and a series resistor 26 of the same. The terminal 18 is further connected to the junction point between the on-off switch 22 and the glow lamp 24 via a series circuit with an overtemperature fuse 28, the heater resistor 30 of the water heater, and the temperature-dependent switch 14, the latter serving as the temperature control in keep-hot operation.

FIG. 3 is a temperature-time diagram showing how the temperature at the water tube 4 of the continuous-flow heater 3 develops during the brewing of the coffee and the subsequent keep-hot period, using the known circuit according to FIG. 4. The temperature for an uncalcified water tube is shown by a solid line, while the temperature curve for a water tube which is just calcified so much that decalcification is necessary, is shown by a broken line. The temperatures rise steeply when the appliance is switched on, and then stays approximately constant during the brewing period when the brewing temperature is reached, and during which period the continuous-flow heater 3 transports water. At the end of the brewing operation, when all the water is pumped from the freshwater tank of the coffee maker into the coffee filter and into the coffee pot, the temperature of the continuous-flow heater 3 rises rapidly until the upper switching point of the temperature control 14 is reached and the tubular heater 6 is switched off. The temperature at the water tube thereupon drop until the lower switching point of the control 14 is reached and the heater is switched on again. The temperature of the continuous-flow heater then oscillates between the two switching points of the temperature-dependent switch 14 serving as the control, until the coffee maker is switched off.

If the water tube 4 is calcified, the temperature at the water tube 4 rises in the brewing operation to an appreciably higher value a, e.g. 5°–10° F. or more, due to the then poorer heat transfer through the wall of the water tube or container, as can be seen from the dashed curve shown in FIG. 3. The time of brewing also is longer if the water tube 4 is calcified. However, at the end of the brewing time, a rapid temperature rise again occurs to the upper switching temperature of 14. During keep-hot operation, the temperature then oscillates between the two switching points of the control 14 in the same manner as when the appliance is not calcified. The higher switching temperature of thermostat 14 is shown by line b in FIG. 3.

Figure 5:
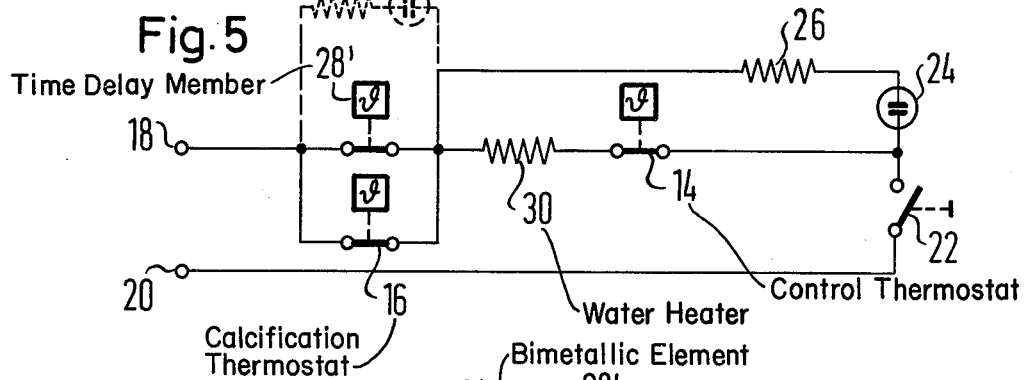
FIG. 5 is a modification of the circuit diagram of FIG. 4, a first embodiment, with the indicating device for the extent of calcification.

In the electric system of a coffee maker shown in FIG. 5, the circuit of FIG. 4 is modified in order to obtain a calcification indication. The function of the temperature fuse 28 which melts at overtemperature is assumed by a shunt circuit which consists of a current-dependent switch 28' and a second temperature-dependent switch 16 shown in FIG. 2. Current-dependent switch 28' is connected in series with the heater resistor 30 and the first temperature-dependent switch 14. The current-dependent switch 28', because of this protective function, is also a safety temperature control. As a further modification of the circuit of FIG. 4, the series resistor 26 of the glow lamp 24 is connected to the connection between the heater resistor 30 and the parallel circuit consisting of the current-dependent switch 28' and the second temperature-dependent switch 16.

Figure 6:
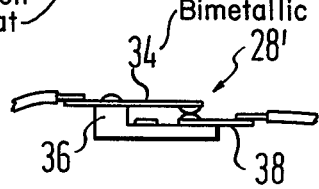
FIG. 6 is a current-dependent switch.

The current-dependent switch 28', as shown in FIG. 6, has a bimetal element 34 through which current flows in the closed condition. This element 34 is fastened on an insulating base 36 and cooperates with a second contact element 38.

The operation of the calcification indicator using an appliance with the circuit of FIG. 5 will be described in the following:

(a) Appliance Not Calcified or Moderately Calcified:

When the on-off switch 22 is switched on the power circuit is closed and the glow lamp 24 as the operating indicator lights up. During the brewing process, the second temperature-dependent switch 16 does not respond, as the temperature at the continuous-flow heater or the water tube of the continuous-flow heater is below the switching temperature a (FIG. 3). At the end of the brewing period, the temperature rises rapidly, the second temperature-dependent switch 16 opens and the heater current continues to flow via the safety temperature control 28', which is designed as a temperature-dependent switch, whereby the latter is heated up. Its response time is adjusted, matched to the continuous-flow heater 3 and the first temperature-dependent switch 14, to a value somewhat larger than 15 seconds. Before the end of this period, i.e., before the safety temperature control 28' opens, the first temperature-dependent switch 14 opens and the heater current is interrupted. Now, the heater system cools off until the first temperature-dependent switch 14 closes again and the power is switched on again for about 15 seconds. This cycle is repeated during the keep-hot operation as shown in FIG. 3 in the solid curve, which in uncalcified condition is not changed by the calcification indicator. The time behavior of the safety temperature control 28' is adjusted so that it also never responds in keep-hot operation.

A continuous-flow heater serving for heating the keep-hot plate of the coffee maker was chosen as the embodiment example. The circuits described can be applied, however, to continuous-flow heaters which are independent of the keep-hot plate, in which the temperature rises at the end of the brewing process when the water heater runs dry, and operates an off-switch of the water heater heating system, which off-switch takes the place of the first temperature-dependent switch serving as the control.

(b) Appliance Calcified

If the on-off switch 22 is switched on, the power circuit is closed and the glow lamp 24 lights up. During the brewing process, the second temperature-dependent switch 16 opens, as the temperature at the water tube reaches the switching temperature a and the heater current flows via the current-dependent safety temperature control 28'. The latter opens after somewhat more than 15 seconds and interrupts the current supply to the heater resistor 30 of the continuous-flow heater, whereby the water supply is also interrupted. At the same time, the operation indicating lamp is extinguished and thereby indicates the calcified condition.

After a short time (about 20 seconds), the heating system has cooled off to an extent that the second temperature-dependent switch 16 recloses. Now, the heating system is switched on again and the water supply is resumed until the second temperature-dependent switch 16 interrupts the power again after about 1 minute. The heater 30 and the operations indicating lamp 24 are now again switched off for about 20 seconds as a result of temperature control 28' opening as described above. Variations of this cycle can occur in the meantime several times by switching back the current-dependent switch.

This control cycle is repeated until the water tank is empty. Thereupon follows the usual quite normal keep-hot operation, since now the first temperature-dependent switch 14, serving as a temperature control, goes into action. The user's attention is called to the calcification not only by the temporary dropping-out of the operation indicating light 24, but also by the lengthening of the brewing time, which is caused by the fact that the heater resistor 30 is disconnected during the brewing process. The temperature fluctuations resulting during the brewing time are not plotted in the figure.

The interruptions of the heating during the brewing operation in calcified condition have the further advantage of reducing the considerable alternating temperature stresses while the appliance in steaming, which occur in coffee makers without or with other calcification indicating devices. This is important particularly if the water tube consists of a sensitive material such as aluminum which has a tendency toward embrittlement. As a further effect of the heating interruptions during the brewing operation, less water evaporates and the user gets the desired number of cups of coffee.

(c) Indication in Case of Trouble in the Electrical System

The first temperature-dependent switch 14 serving as a control does not open

At the end of the brewing period, the second temperature-dependent switch 16 opens and subsequently, the current-dependent safety temperature control 28'. The on/off ratio is adjusted so that the cycled power does not damage the equipment. The customer notices this type of trouble because the operation indicating lamp (24) is extinguished in keep-hot operation and comes on only during the brief on-cycle times.

The Current-Dependent Safety Temperature Control 28' does not open

At the end of the brewing period, the first temperature-dependent switch 14 opens. The equipment continues to function normally. However, no calcification indication comes on any more even though the water heater is in the calcified condition

(d) False Information of the Circuit if the Brewing Process is Repeated in the Still Hot Condition As in all known circuit solutions in which a control or temperature-dependent switch is used for the calcification indication, false information occurs here, too, if the brewing is repeated, i.e., if water is refilled into the still hot equipment. As the second temperature-dependent switch 16 has no opportunity to switch back because of its switching temperature difference, the power is interrupted shortly after the brewing begins by the current-dependent safety temperature control 28' and a calcification indicating signal is given. If thereafter the temperature level has dropped so far that the second temperature-dependent switch has dropped back into its closed condition, then the false information is corrected. The false information is relatively brief.

In the following, possible modifications of the circuit according to FIG. 5 will be described. Thus, a separate visual or acoustic indicator can be connected parallel to the second temperature-dependent switch 16 and the safety temperature control 28'. In FIG. 5, a visual alarm with a glow lamp 40 and associated series resistor 42 is shown in dashed lines.

A PTC resistor could be connected in series with an acoustic signal so that the signal sounds only for a short time.

Instead of the current-dependent safety temperature control 28', one can further use a protective temperature limiter, which must be pushed back in by hand. In case of calcification, the brewing operation then proceeds just about exactly as described above for the circuit according to FIG. 5, only the temperature of the keep-hot operation is somewhat lower, as in that case, the second temperature-dependent switch 16 functions as a control. The operation indicating lamp 24 remains out except for the brief on-cycle pulses.

Figure 7:
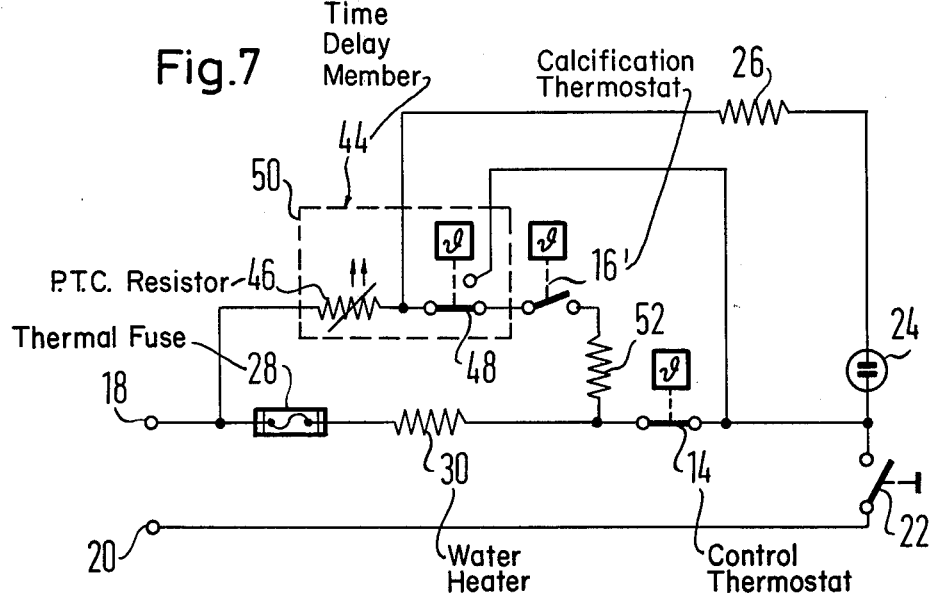
FIG. 7 is a circuit diagram showing a modified embodiment of the indicating device in accordance to the invention.

The modified embodiment of a calcification indicator shown in FIG. 7, enables a calcification signal which occurred during the brewing state to be held also during the keep-hot operation. In modification of the circuit according to FIG. 4, which has no calcification indication, a time delay member 44 is interposed between the line terminal 18 and the series resistor 26 of the operation indicating lamp 24. It comprises a PTC resistor 46 and in series therewith a double-throw switch 48 heated by the NTC (negative temperature coefficient) resistor. The dashed line 50 enclosing the PTC resistor 46 and the switch 48 is to indicate that these two components are tied together and cooperate not only electrically but also thermally. A second contact of the temperature-dependent double-throw switch 48 is connected via a second temperature-dependent switch 16' which is open in the rest condition, and a voltage divider resistor 52, to the junction point between the heater resistor 30 and the first temperature-dependent switch 14. The third terminal of the temperature-dependent double-throw switch 48 of the time delay member 44 is tied to the junction point between the first temperature-dependent switch 14, the on-off switch 22 and the operation indicating lamp 24. The series resistor 26 of the operation indicating lamp 24 is connected to the junction point between the PTC resistor 46 and the temperature-dependent double-throw switch in the time delay member 44.

If the equipment is not calcified, the power circuit is closed if the on-off switch 22 is switched on and the operation indicating lamp 24 lights up, its relatively small supply current flowing through the PTC resistor 46 in the time delay member. Shortly (about 15 seconds) before the end of the brewing period, the second temperature-dependent switch 16' closes and the PTC resistor 46 in the time delay member 44, now connected parallel together with the resistor 52 to the heater resistor 30, is heated up. The resistor 52 and the PTC resistor 46 form a voltage divider feeding the operation indicating lamp and the resistance of 52 must therefore be higher than the resistance of the PTC resistor 46 so that the operation indicating lamp 24 does not go out. Within the 15 seconds during which the second temperature-dependent switch 16' and the first temperature-dependent switch 14 are closed, the resistance of the PTC resistor 46 does not change as its operating temperature is not yet reached. After the 15 seconds mentioned, the first temperature-dependent switch 14 opens due to the further rise of the temperature at the continuous-flow heater or the water tube, whereby the flow of current through the resistor 52 and the PTC resistor 46 is interrupted. In keep-hot operation, this 15-second cycle is repeated, but the PTC resistor 46 does not heat up enough to make the temperature-dependent double-throw switch 48, which is thermally coupled thereto, to switch over.

If the equipment is calcified, the second temperature-dependent switch 16' closes in brewing operation and the PTC resistor 46 has enough time to heat up (about 30 seconds) so as to make the double-throw switch 48 of the time delay member 44 switch over. Now, the operation on indicating lamp 24 is extinguished because it is short-circuited, and always remains extinguished as the PTC resistor 46 is continuously supplied with current via the double-throw contact of the temperature-dependent double-throw switch 48 of the time delay member and therefore remains heated continuously.

Figure 8:
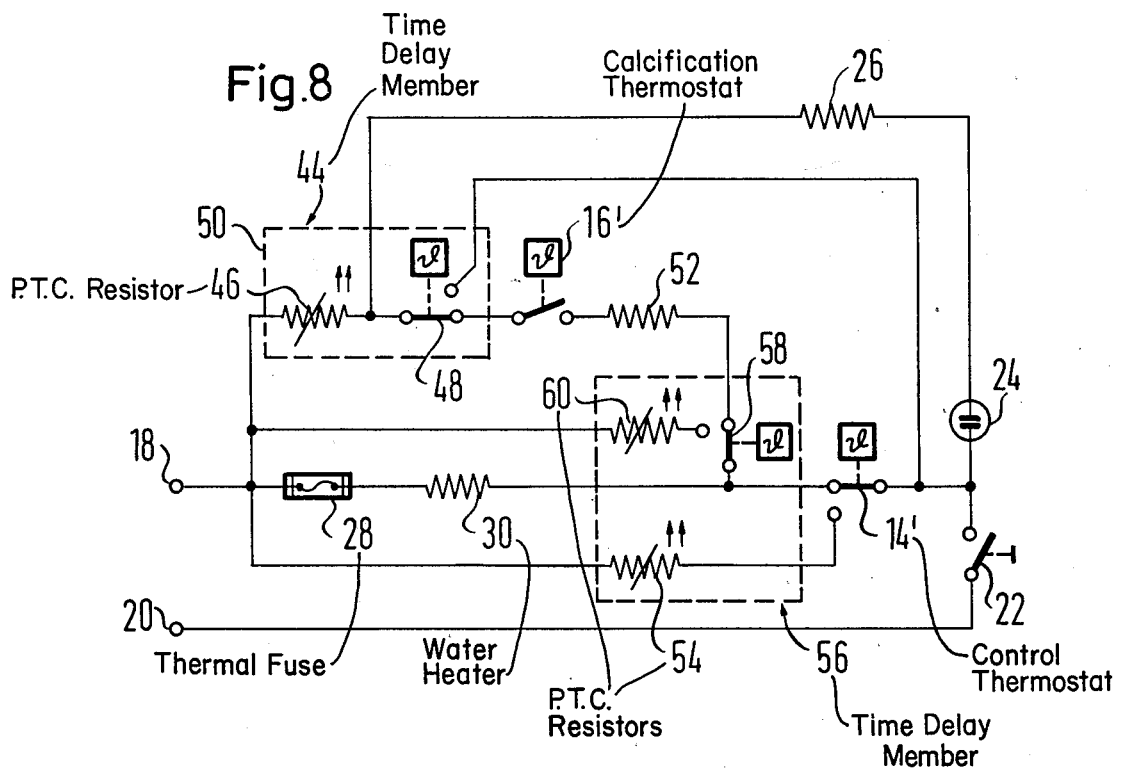
FIG. 8 is a circuit diagram showing another modified embodiment of the indicating device in accordance with the invention.

FIG. 8 shows a circuit, in which a false indication is prevented if the brewing is repeated while the equipment is still hot.

As discussed above, the continuous-flow heater generates only steam at first, if it is operating in the hot, dry keep-hot condition, when fresh water is added. The continuous-flow heater cools down relatively slowly in the process, and slowly traverses the temperature range in which the calcification indicators respond.

In the circuit of FIG. 8, the first temperature-dependent switch is a double-throw switch 14', as a modification of the embodiments described above. A PTC resistor 54 of a second time delay member 56 is connected between its double-throw contact and the terminal 18. In addition, a temperature-dependent double-throw switch 58 of the second time-delay switch 56 is connected between the voltage divider resistor 52 and the junction point between the heater resistor 30 and the first temperature-dependent switch 14' and maintains this connection in the starting condition. A second PTC resistor 60 of the second time delay member 56 is connected between the change-over contact of this temperature-dependent double-throw switch 58 and the terminal 18. The PTC resistors 54 and 60 act thermally on the temperature-dependent double-throw switch 58.

The circuit with this additional time delay member 56 operates as follows: After each brewing operation, the first temperature-dependent switch, in the present case, the double-throw switch 14', switches and heats the PTC resistor 54, so that the temperature-controlled double-throw switch 58 of the second time-delay member 56 is made to switch over. The flow of current through the voltage divider 52 and the second temperature-dependent switch 16' is therefore interrupted. If brewing follows immediately (the second temperature-dependent double-throw switch 16' does not open) the temperature-dependent double-throw switch of the second time delay member 56 remains in the switched condition and thereby applies voltage to the PTC resistor 60 which, in its hot condition, continues to hold the temperature-dependent double-throw switch 58 of the time delay member 56 in the switched condition. A calcification indication can therefore no longer take place.

Figure 9:
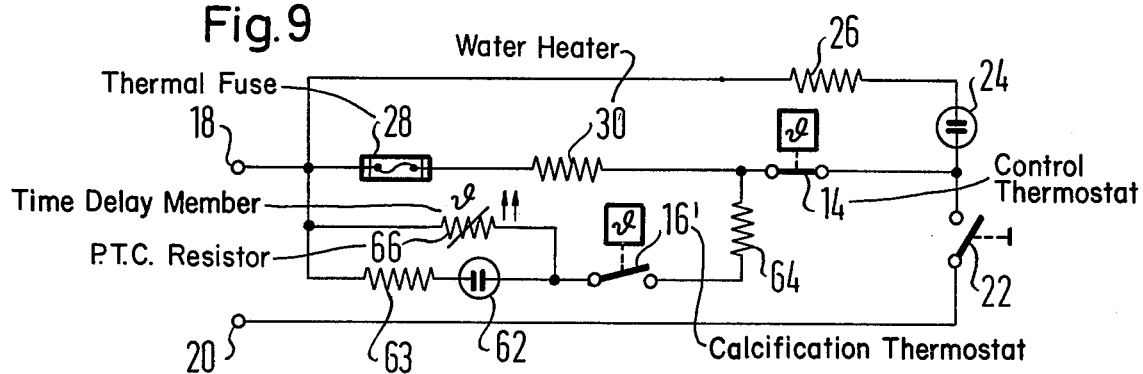
FIG. 9 is a circuit diagram showing a further modified embodiment.

FIG. 9 shows a further calcification indicating circuit with a modified first time delay member and an indicator glow lamp 62 which is independent of the operation indicating lamp 24. This is a modification of the circuit of FIG. 4, which has no calcification indication. A series circuit consisting of a series resistor 64, a second temperature-dependent switch 16' and the glow lamp 62 with its associated series resistor 63 is connected between the junction of the heater resistor 30 and the first temperature dependent switch 14, and the terminal 18. A resistor 66 which switches in dependence on the temperature, is connected parallel to the glow lamp 62 and its series resistor 63 between the terminal 18, and the junction point of the glow lamp 62 and the second temperature-dependent switch 16'.

If the second temperature-dependent switch 16' is energized and closes, a current flows via the latter and the series resistor 64 and the resistor 66. In the uncalcified condition of the equipment, the first temperature-dependent switch 14 will open before the resistor 66 has been heated far enough so that its resistance together with the series resistor 64 brings about a firing voltage at the indicating glow lamp 62.

In the calcified condition of the equipment, the first temperature-dependent switch 16' closes during the brewing operation and the resistor 66 has enough time to heat up to its cut-off temperature, whereby the indicating glow lamp 62 lights up.

The keep-hot operation is the same for calcified equipment as it is for equipment not calcified. The second temperature-dependent switch 16' is always closed and the first temperature-dependent switch 14 serving as the temperature control, opens and closes cyclically and thereby cyclically supplies the resistor 66 with current. The resistor 66 can be designed so that the current pulses in keep-hot operation are not sufficient to heat it to the cut-off temperature.

All the PTC resistors used in the above-described circuits are preferably ceramic PTC resistors with a step function, which can be connected to 220 V.

Figure 10:
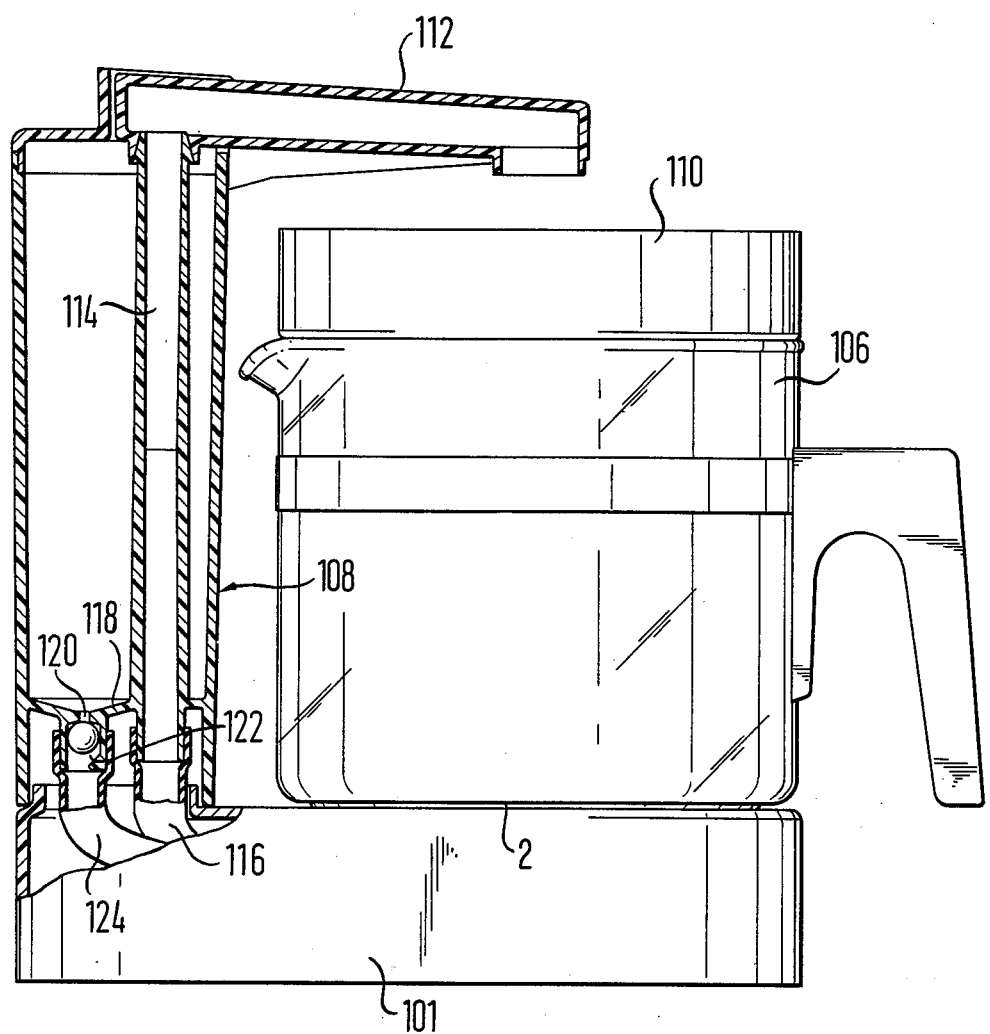
FIG. 10 illustrates a complete coffee maker of the type partially shown in FIGS. 1 and 2.

For a better understanding, the overall coffee maker, parts of which were shown in FIGS. 1 and 2, is depicted in FIG. 10. In this coffee maker a freshwater tank 108 is arranged on a housing 101 which contains a continuous-flow heater, shown in FIGS. 1 and 2, for heating and pumping the brewing water, as well as the keep-hot plate 2, arranged on top thereof, for a coffee pot 106 placed thereon. On the coffee pot 106 is placed a coffee filter 110, into which the brewing water is supplied via an overflow tube. The overflow tube 112 is connected to a standpipe 114 leading through the freshwater tank 108. The lower end of overflow tube 112 is in turn connected via a hose 116 to the upper end, as seen in FIG. 2, of the water tube 4. At the bottom 118 of the freshwater tank 108 is arranged a runoff 120 with a check valve 122. The check valve 122 is connected via a hose 124 to the lower end, as seen in FIG. 2, of the water tube 4 of the continuous-flow heater 3.

The electric coffee maker shown in FIGS. 1, 2 and 10 now operates as follows.

An amount of water corresponding to the desired amount of coffee is filled into the freshwater tank 108 and a corresponding amount of ground coffee is placed in the filter 110. Then, the appliance is switched on by means of the on-off switch 22 (FIG. 5) and current flows through the tubular heating element 6 (FIGS. 1 and 2) or its heater resistor 30 (FIG. 5). Thereby, the water tube 4 filled with standing fresh water is heated. As soon as the fresh water in the tube 4 is hot enough to develop a small amount of steam it builds up a pressure in the tube 4, which closes the check valve 122 and pumps part of the now hot water upward through the hose 116, the standpipe 114 and the overflow tube 112 into the coffee filter 110. The pressure in the water tube 4 then drops again so that a small amount of fresh water can flow in or is sucked in through the check valve 122, which opens, and the hose 124. In this manner, all the fresh water from the freshwater tank is heated and pumped into the coffee filter 110. If the freshwater tank 108 is empty and the remaining moisture evaporated, the temperature of the continuous-flow heater 3 rises as was already described in connection with the diagram in FIG. 3, until the temperature control 14 responds. From then on until the appliance is switched off, the temperature control 14 switches the heater resistor 30 of the tubular heating element cyclically on and off and thereby supplies to the keep-hot plate 2 a controlled amount of heat to keep the coffee in the coffee pot 106 hot.

There is claimed:

1. In a water heater associated with an electric household appliance, said water heater being subject to calcification caused reduction in heat transfer through the wall of the water container of the water heater, said water heater having a heater resistor adjacent the water container, a first temperature-dependent switch thermally coupled to the water container being in circuit with said heater resistor to act as the final control for the water heater; the improvement comprising the combination therewith of means for indicating calcification of the water heater, said calcification indicating means comprising a second temperature-dependent switch thermally coupled to the water container, the switching temperature of the second temperature-dependent switch being below the switching temperature of the first temperature-dependent switch and in the range of temperatures which occur with calcification in the water-heating operation, a calcification indicating signal and a time delay member operative after a predetermined time delay to actuate said indicating signal, said time delay member being so arranged in circuit with said first and second temperature-dependent switches that said time delay member is operative to actuate said indicating signal when only a second temperature dependent switch is in responded condition, and which time delay member ceases operation and returns to its original state when the first temperature-dependent switch is in its responded state.

2. Water heater with indicating device according to claim 1, wherein the time delay member is a current-dependent switch.

3. Water heater with indicating device according to claim 2, wherein the current-dependent switch also provides for overtemperature protection, and the current-dependent switch and the second temperature-dependent switch are arranged parallel to each other and in series with said heater resistor of the water heater.

4. Water heater with indicating device according to claim 2, wherein the current-dependent switch includes a resistor heating a bimetal element.

5. Water heater with indicating device according to claim 2, wherein the current-dependent switch includes a temperature-dependent resistor.

6. Water heater with indicating device according to claim 5, wherein the temperature-dependent resistor is a PTC resistor.

7. Water heater with indicating device according to claim 2, wherein the current supply to the current-dependent switch is varied by means of the first and the second temperature-dependent switch.

8. Water heater with indicating device according to claim 1, including a glow lamp in the heater resistor circuit which glows when electric current flows through the circuit, said lamp also serving as said calcification indicating signal.

9. Water heater according to claim 1, wherein the second temperature-dependent switch is arranged to control the temperature of the water heater, if the equipment is calcified, by switching the heater resistor on and off.

10. Water heater according to claim 1, wherein to avoid a false indication if the brewing is repeated while the appliance is hot, the first temperature-dependent switch is a double-throw switch and energizes, when switching, a relay having a self-holding means, said relay being in circuit with said indicating signal and being arranged to cancel the indication and interrupt the current supply to the time delay member.

* * * * *